United States Patent
Desbiens (10) Patent No.: US 8,144,737 B2
(45) Date of Patent: Mar. 27, 2012

(54) ADJUSTABLE PULSEWIDTH PICOSECOND FIBER LASER

(75) Inventor: Louis Desbiens, St-Augustin-de-Desmaures (CA)

(73) Assignee: Institut National d'Optique, Quebec (CA)

( * ) Notice: Subject to any disclaimer, the term of this patent is extended or adjusted under 35 U.S.C. 154(b) by 308 days.

(21) Appl. No.: 12/498,072

(22) Filed: Jul. 6, 2009

(65) Prior Publication Data

US 2011/0002348 A1    Jan. 6, 2011

(51) Int. Cl.
*H01S 3/30*  (2006.01)

(52) U.S. Cl. .................. 372/6; 372/18; 372/25

(58) Field of Classification Search ........... 372/6, 18, 372/25
See application file for complete search history.

(56) References Cited

U.S. PATENT DOCUMENTS

| | | | |
|---|---|---|---|
| 5,208,455 A | 5/1993 | Nelson et al. | |
| 5,359,612 A | 10/1994 | Dennis et al. | |
| 5,450,427 A * | 9/1995 | Fermann et al. | 372/10 |
| 5,497,386 A | 3/1996 | Fontana | |
| 5,513,194 A | 4/1996 | Tamura et al. | |
| 5,742,634 A | 4/1998 | Rieger et al. | |
| 6,163,630 A | 12/2000 | Evans | |
| 6,901,177 B2 | 5/2005 | Ionov | |
| 6,985,283 B1 | 1/2006 | Islam et al. | |
| 7,171,082 B2 | 1/2007 | Ionov | |
| 7,555,022 B2 * | 6/2009 | Liu | 372/6 |
| 2006/0007965 A1* | 1/2006 | Tankovich et al. | 372/10 |
| 2008/0144676 A1 | 6/2008 | Nicholson | |

FOREIGN PATENT DOCUMENTS

| | | |
|---|---|---|
| EP | 0 644 633 A1 | 3/1995 |
| WO | WO 92/16037 A1 | 9/1992 |
| WO | WO 2007/018675 A2 | 2/2007 |

OTHER PUBLICATIONS

Deep Photonics, DUV Picosecond Fiber Laser for Thin-film Photovoltaic's http://deepphotonics.com/whitePapers/DUV_Fiber_Laser_Technology_for_Thin_Film_Photovoltaics.pdf (bearing publication date Aug. 29, 2008 and as downloaded Aug. 27, 2009).

Tamura et al. "77-fs pulse generation from a stretched-pulse mode-locked all-fiber ring laser" *Opt. Lett.*, vol. 18, No. 13, 1993. 1080-1082 p.

Agrawal, G.P., *Nonlinear fiber optics*. Academic Press, 1995, second edition, pp. 142 and 151.

PicoQuant GmbH, Products: Pulsed Lasers and Light Sources: Ultraviolet to Infrared Picosecond Diode Laser Heads http://www.picoquant.com/getfs.htm?products/ldh/ldhseries.htm (as downloaded Aug. 31, 2009).

* cited by examiner

*Primary Examiner* — Kinam Park
(74) *Attorney, Agent, or Firm* — Merchant & Gould P.C.

(57) ABSTRACT

A pulsed fiber laser generating light pulses in the picosecond range has an adjustable pulsewidth. The fiber laser includes a figure-of-eight type laser cavity, preferably of polarization-maintaining optical fiber, defining reciprocal and non-reciprocal loops. A gain medium is disposed asymmetrically in the reciprocal loop, at a position therealong favoring coupling of light in the propagation direction of the non-reciprocal loop. A pump source is coupled to the reciprocal loop to inject pump light into the gain medium. The laser cavity is designed so that changing the pump power will directly affect the pulsewidth of the generated light pulses, providing a useful control mechanism of the pulsewidth.

19 Claims, 10 Drawing Sheets

ADJUSTABLE PULSEWIDTH PICOSECOND FIBER LASER

FIELD OF THE INVENTION

The present invention relates to pulsed fiber laser and more particularly concerns a fiber laser generating light pulses having an adjustable pulsewidth of the order of picoseconds.

BACKGROUND

Pulsed fiber lasers are currently of great interest for a variety of applications. One such application is scribing semiconductor materials. Material ablation with laser pulses can be separated in two distinct regimes of operation; thermal and non-thermal. In the thermal regime, the laser energy is transferred to the material lattice through electron-phonon interactions. If atoms are ejected from the lattice before such interactions can really take place, than the process is considered non-thermal. The timescale over which the energy transferred to the electrons by the laser pulse is further transferred to the lattice is of the order of tens of picoseconds (typically 5-50 ps depending on materials). Consequently, picosecond pulses with a duration greater than this characteristic timescale are considered the shortest pulses that can still be considered to operate in the thermal regime.

Advantageously, micro-machining with the shortest pulse in the thermal regime reduces to the minimum the size of the heat affected zone (HAZ) surrounding the targeted region. This is highly relevant in applications where multiple layers are stacked and only one of those layers is targeted, such as for example in the drilling of via in photovoltaic cells used in solar panels.

Picosecond pulses are characterized by high peak power (ten to hundreds of kilowatts for micro joules pulses) and narrow linewidth (less than 1 nm for transform limited pulses). This combination is very advantageous for frequency conversion (second, third and forth harmonic), which opens up significantly the range of applications a single powerful picosecond source can address.

Mode-locked femtosecond laser, bulk or fiber-based, can be modified to produce picosecond pulses. Generally speaking, mode-locked fiber lasers are considered particularly attractive structures for ultra-short pulse generation, via either passive or active mode-locking. The pulse-generation mechanism in such lasers depends on the physics of the cavity. Known cavity configurations include linear cavities, ring lasers and figure-of-eight cavities. To produce picosecond pulses in such a mode-locked regime, a narrow spectral filter placed inside the laser cavity controls the duration of the pulses by the virtue of the Fourier transform. Those designs are usually not very flexible since they necessitate a tuning of the filter bandwidth to change the pulse duration. This tuning can necessitate moving parts.

Picosecond pulses can also be produced with gain-switched semiconductor diode lasers, where the pulses are advantageously generated on demand by an electrical pulse. However there is little correlation between the electrical pulse sent and the received optical pulse. The optical pulse is in fact the impulse response of the device, and therefore has a duration which differs from chip to chip. In addition, such diodes offer very little control on the spectral content of the emitted pulses, which is usually quite broad, and the optical pulse is often followed by relaxation oscillations.

There remains a need in the field for picosecond fiber lasers suited to the requirements of micromachining and similar industrial applications.

SUMMARY OF THE INVENTION

In accordance with an aspect of the present invention, there is provided a fiber laser for generating light pulses having an adjustable pulsewidth.

The fiber laser includes a laser cavity including optical fiber arranged in a figure-of-eight configuration. The laser cavity defines a non-reciprocal loop having a propagation direction therein and a reciprocal loop having opposite propagation directions therein. The laser cavity further includes a coupler interconnecting the loops.

A gain medium is provided in the reciprocal loop at an asymmetrical position with respect to the coupler, this position being selected so that the light pulses counter-propagating within the reciprocal loop have a phase relationship at the coupler favoring coupling into the propagation direction of the non-reciprocal loop.

The fiber laser further includes a pump source coupled to the reciprocal loop for launching a pump light beam in the gain medium, the pump light beam having a pump power value. Pump control means are provided for controlling the pump power value of the pump source within a range extending above an operational lasing threshold of the laser cavity. Changing the pump power value of the pump source within this range changes the pulsewidth of the light pulses without modifying a peak power of said light pulses.

Advantageously, the present invention makes use a nonlinear amplifying loop mirror using to control the pulsewidth inside a laser cavity.

Preferably, the fiber laser according to embodiments of the invention emits picosecond pulses. Optionally, an amplitude or phase modulator may be placed inside the laser cavity to help ignite the mode-locked regime and to provide the possibility of increasing the repetition rate of the laser by an integer number. A modulator may also be placed at the output of the laser to serve as a "pulse-picker", extracting a light pulse from the cavity at an external request.

Other features and advantages of the present invention will be better understood upon reading of preferred embodiments thereof with respect to the appended drawings.

DESCRIPTION OF THE PREFERRED EMBODIMENT OF THE INVENTION

Figure 1A:
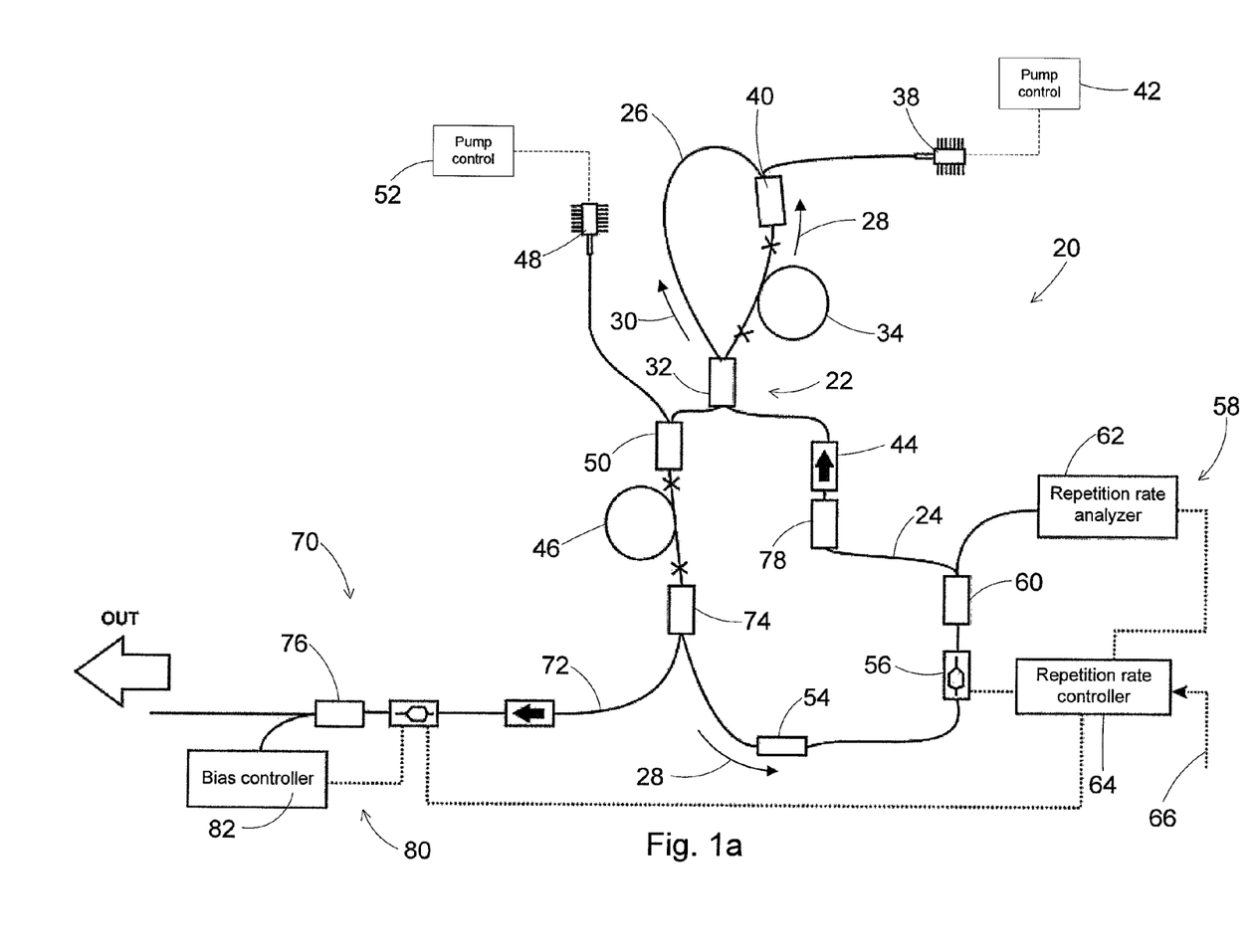
FIG. 1A is a schematic representation of a fiber laser according to an embodiment of the invention.
Figure 1B:
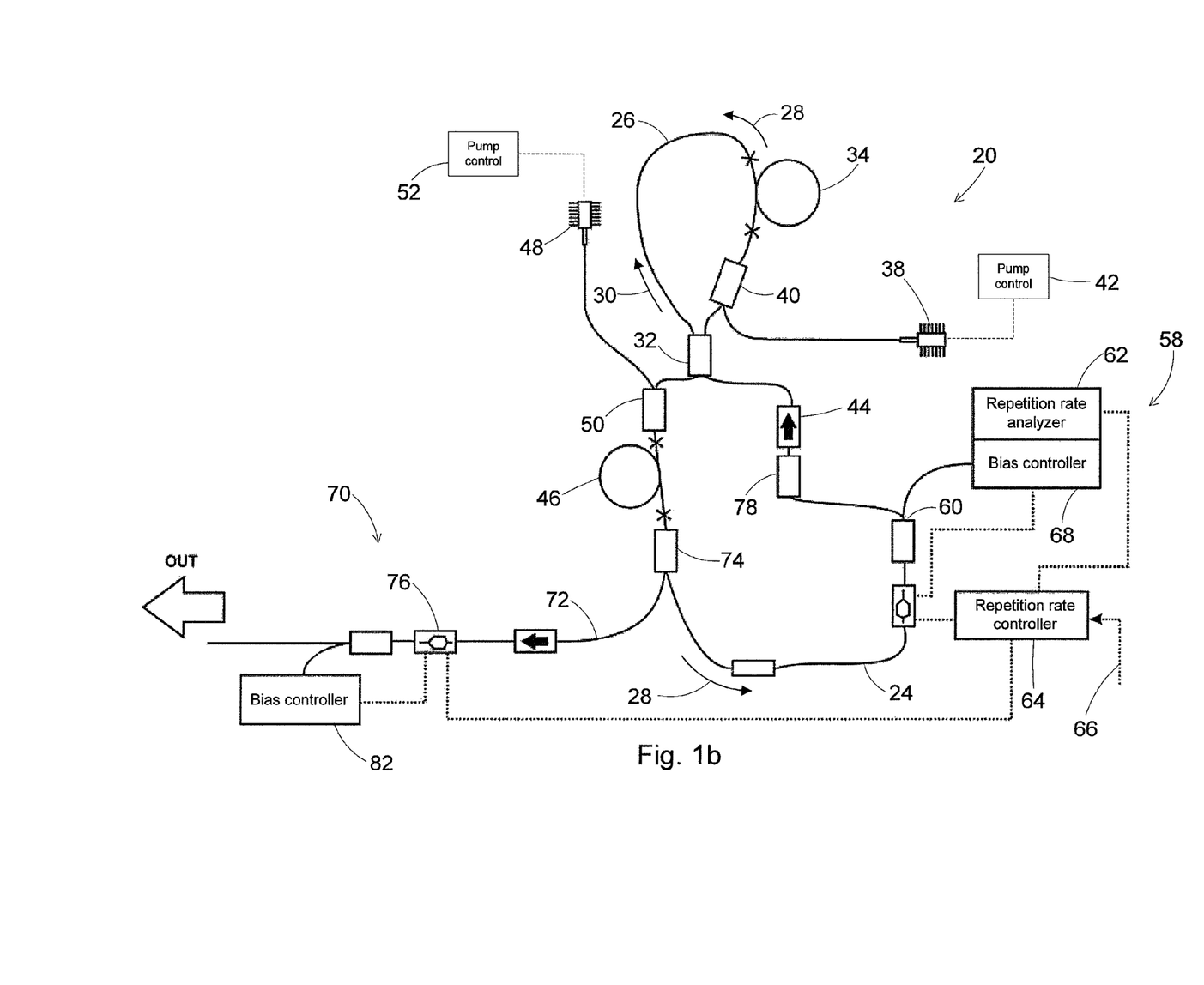
FIG. 1B is a schematic representation of a fiber laser according to another embodiment of the invention.

Referring to FIGS. 1A and 1B, variants of fiber lasers 20 according to embodiments of the invention are shown.

Advantageously, fiber lasers of the present invention allow the generation of light pulses having an adjustable pulsewidth, that is, pulses having a duration in time which can be set or changed by a user according to a desired output. The mechanism allowing this adaptability feature will be explained further below. Preferably, the pulsewidth or pulse duration is of the order of picoseconds, for example between 1 and 1000 picoseconds.

Throughout the description below, the expressions "pulsewidth" and "pulse duration" will be used interchangeably to refer to the full width at half maximum of the optical pulse with respect to time.

Referring more particularly to FIG. 1A, the fiber laser 20 according to the illustrated embodiment of the invention includes a laser cavity 22, made of optical fiber arranged in a "figure-of-eight" configuration. In the preferred embodiment, the optical fiber in the laser cavity is polarization-maintaining (PM) normal dispersion fiber. The use of such fiber advantageously limits undesired nonlinear effects in the laser cavity such as nonlinear polarization rotation, and ensures an environmentally stable operation of the laser, which can be an important factor in the context of industrial applications. By definition, the figure-of-eight configuration is generally composed of a non-reciprocal loop 24 and a reciprocal loop 26. In the present context, the concept of reciprocality relates to the propagation of light in the optical fiber constituting each loop. The non-reciprocal loop limits the propagation of light therein in a single propagation direction, arbitrarily chosen to be the counter-clockwise direction 28 in the illustrated embodiment, while the reciprocal loop allows light circulation in both opposite directions therein, that is, in both the clockwise direction 30 and counter-clockwise direction 28. Preferably, an isolator 44 is provided in the non-reciprocal loop 24 at a position appropriate to block light propagation in the direction opposite the propagation direction (clockwise in the illustrated case).

The laser cavity 22 further includes a main coupler 32 interconnecting both loops 24 and 26. Preferably, the main coupler 32 is a 50/50 PM coupler, that is, the main coupler 32 couples light into opposite extremities of the reciprocal loop 26 according to a ratio of substantially 50/50. Alternatively, the main coupler 32 may be embodied by a coupler having a different coupling coefficient value, a wavelength-division multiplexing (WDM) coupler or a polarization combiner/splitter. Due to the bidirectional nature of the reciprocal loop 26, light pulses circulating therein will interfere at the main coupler 32, and the phase difference therebetween will dictate the fraction of power that will be coupled in the clockwise direction of the non-reciprocal loop, where it will be lost, and the fraction coupled in the propagation direction of the non-reciprocal loop and make a round-trip in the laser cavity 22. The laser cavity 22 is designed as a nonlinear loop mirror to take advantage of this characteristic. A gain medium 34 is provided in the reciprocal loop 26, at an asymmetrical position with respect to the main coupler 32. A pump source 38 is coupled to the reciprocal loop 26 for launching a pump light beam in the gain medium 34. As shown in FIGS. 1A and 1B, the pump signal may be coupled on either side of the gain medium 34. A WDM pump coupler 40 or any other appropriate coupling means is provided for connecting the optical fiber from the pump source 38 to the optical fiber of the reciprocal loop 26.

The nonlinear amplifying loop mirror (NALM) defined by the reciprocal loop 26 will have a maximum transmission for a certain value of pulse peak power which is dependent on the available gain in the loop. To produce picosecond pulses the loop needs to be asymmetrical, meaning that the available gain must be concentrated at one end of the loop, preferably favoring low values of peak power (tens of watts). In practice, this is accomplished through an adequate positioning of the gain medium 34 in the reciprocal loop 26. Varying the pump power will affect the laser dynamic in such a way that the pulse duration will vary as explained hereinbelow.

The position of the gain medium 34 along the reciprocal loop 26 with respect to the main coupler 32 is further selected so that light pulses counter-propagating within the reciprocal loop 26 have a phase relationship at the main coupler 34 favoring coupling into the propagation direction 28 (counter-clockwise) of the non-reciprocal loop 24. The relevance of the position of the gain medium 34 along the reciprocal loop 26 is best understood through the following theoretical analysis of the accumulated nonlinear phase shift in a nonlinear loop mirror, with reference to FIGS. 8, 9 and 10.

Figure 8:
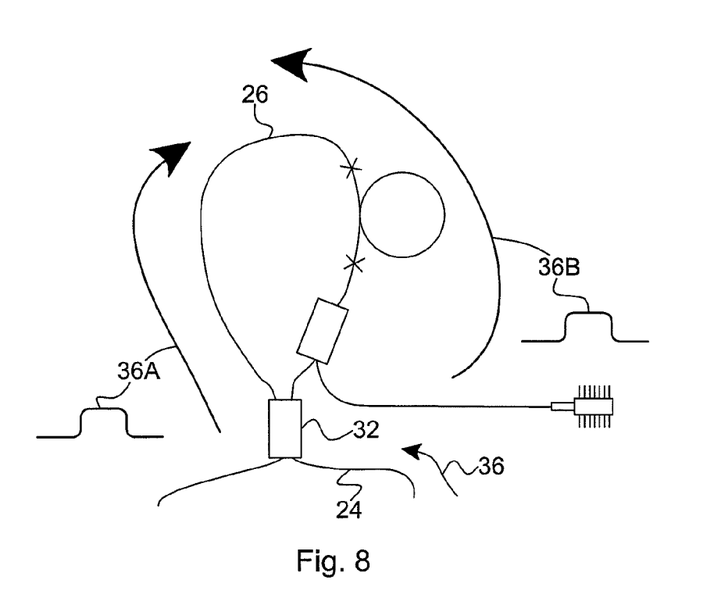
FIG. 8 is a schematic representation of the propagation of pulses A and B in the reciprocal loop.

With particular reference to FIG. 8, consider a light pulse 36 guided along the propagation direction of the non-reciprocal loop 24. The main coupler 32, here assumed to be a 50/50 coupler, separates the power in pulse 36 equally into two counter-propagating pulses 36A and 36B respectively coupled into opposite ends of the reciprocal loop 26. At the beginning of the propagation within the reciprocal loop 26, immediately after the main coupler 32, pulses 36A and 36B are identical.

The accumulated nonlinear phase shift through the propagation in the reciprocal loop is given by the B-integral:

$$B(t) = \int_0^L \gamma P_i(t) dz \tag{1}$$

where γ is the nonlinear coefficient, which is fiber dependent, and $P_i(t)$ is the peak power along the pulse.

Figure 9:
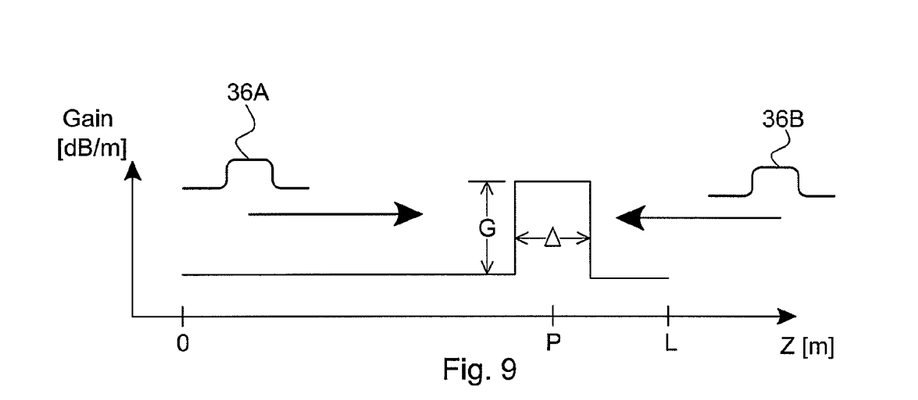
FIG. 9 is a diagram of the gain in the reciprocal loop as a function of position.

Referring to FIG. 9, let L be the length of the fiber inside the reciprocal loop mirror, P the central position of the gain inside the loop, Δ the width of the gain section and G the maximum gain value (in dB/m). The gain will be assumed constant over the doped fiber length and the effects of gain saturation will be neglected.

The B-integral for pulse A or B can be expressed as the sum of three contributing terms: the nonlinear phase shift accumulated in the passive fiber before amplification, the nonlinear phase shift accumulated in the gain medium, and the nonlinear phase shift accumulated in the passive fiber after amplification.

For pulse A, this can be expressed as:

$$B_A(t) = \gamma P_A(t) \left( \begin{array}{c} P - \frac{\Delta}{2} + \frac{10}{G}\log(e)[10^{G\Delta/10} - 1] + \\ 10^{G\Delta/10}\left[L - P - \frac{\Delta}{2}\right] \end{array} \right) \quad (2)$$

and for pulse B:

$$B_B(t) = \gamma P_B(t) \left( \begin{array}{c} L - P - \frac{\Delta}{2} + \frac{10}{G}\log(e)[10^{G\Delta/10} - 1] + \\ 10^{G\Delta/10}\left[P - \frac{\Delta}{2}\right] \end{array} \right) \quad (3)$$

Figure 10:
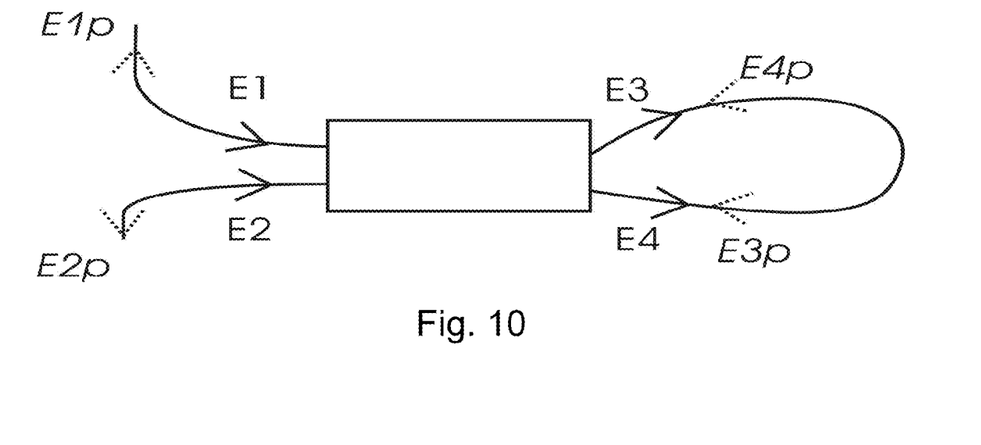
FIG. 10 is a schematic representation of the electric field components on either sides of the main coupler.

As mentioned above, the parameters of the reciprocal loop should be selected so as to favor coupling of the light power returning to the main coupler 32 for both pulses 36A and 36B towards the propagation direction of the non-reciprocal loop 24. Referring to FIG. 10 for the identification of each branch of the cavity on either sides of the main coupler, the electric field associated with the light coupling from the non-reciprocal loop to the reciprocal loop is governed by the following equations:

$$E_3 = \alpha^{1/2} E_1 + i[1-\alpha]^{1/2} E_2 \quad (4)$$

$$E_4 = i[1-\alpha]^{1/2} E_1 + \alpha^{1/2} E_2 \quad (5)$$

$$E_{1p} = \alpha^{1/2} E_{4p} + i[1-\alpha]^{1/2} E_{3p} \quad (6)$$

$$E_{2p} = i[1-\alpha]^{1/2} E_{4p} + \alpha^{1/2} E_{3p} \quad (7)$$

where $E_i$ is the electric field in branch i and $\alpha$ is the coupling ratio of the coupler. For the returning pulses from the reciprocal loop at the coupler, we have:

$$E_{3p} = 10^{G\Delta/20} e^{i(\phi + B3)} E_3 \quad (8)$$

$$E_{4p} = 10^{G\Delta/20} e^{i(\phi + B4)} E_4 \quad (9)$$

where $\phi$ is the linear phase shift associated with the propagation inside the loop.

In the laser configuration of embodiments of the invention, light from the non-reciprocal loop propagates in a single direction, and the input in the reciprocal loop at the coupler is at $E_2$ only. Consequently, the analysis can be simplified by assuming that $E_1 = 0$, and a round-trip inside the laser cavity implies that the output of the loop mirror is at $E_{1p}$:

$$E_{out} = E_{1p} = 10^{G\Delta/20} e^{i(\phi + B4)} \alpha E_2 - 10^{G\Delta/20} e^{i(\phi + B3)} (1-\alpha) E_2 \quad (10)$$

$$E_{in} = E_2 \quad (11)$$

In the case of a 50/50 coupler, the coupling coefficient $\alpha$ is 0.5. In addition, the phase shift between the returning light pulses at the coupler can be expressed as $\Delta_B$ where $B_4 = B_3 + \Delta_B$. With these considerations, the power outputted by the coupler after the interference between the returning pulses can be expressed as:

$$P_{out} = E_{1p} E_{1p}^* = \frac{1}{2} 10^{G\Delta/10} P_{in}(1 - \cos(\Delta_B)) \quad (12)$$

$$P_{in} = E_2 E_2^* \quad (13)$$

from which it is apparent that the output power will be maximal for $\Delta_B = \pi$. Returning to the expression of the accumulated nonlinear phase shift for pulse A and B, this imposes the condition:

$$B_A(t) - B_B(t) = \pm \pi \quad (14)$$

As $B_A(t)$ and $B_B(t)$ depend on the length L of the reciprocal loop and the position P of the gain medium therealong, these parameters can be jointly selected so that the condition of equation (14) is met.

Of course, one skilled in the art will understand that in different embodiments, for example if the main coupler is not 50/50 as above, the optimal value for $\Delta_B$ could differ from $\pi$. Indeed, studies of the effect of gain saturation on the laser cavity described above seem to indicate that the optimal ratio to obtain maximum coupling into the propagation direction of the non-reciprocal loop could be up to 60/40, and may vary with the choice of laser components and operating conditions. It is to be noted that the coupling coefficient may also be wavelength-dependent, as one skilled in the art will know to take into account in the design of the laser cavity and selection of the main coupler.

In addition, it will be further understood that the position of the gain medium in the reciprocal loop could be chosen so as to offset the value for which the outputted power in the propagation direction of the non-reciprocal loop is maximum, if resulting losses from the light coupled into the opposite direction of the non-reciprocal loop are acceptably low for the application considered.

Referring back to FIGS. 1A and 1B, the fiber laser 20 further includes pump control means 42 for controlling the pump power value of the pump source within a range extending above a lasing threshold of the laser cavity 22. By changing the pump power value of the pump source 38 within this range, the pulsewidth of the light pulses generated by the fiber laser 20 can also be changed.

From equations (2), (3) and (14) above, in the case where $\alpha = 0.5$ the input power $P_A$ and $P_B$ are the same, which brings $$\gamma P_A (2P - L)[1 - 10^{G\Delta/10}] = \pm \pi \quad (15)$$

Using equation (15) to deduce $P_A(t)$, and $P_{in} = 2P_A(t)$, equation (12) becomes:

$$P_{out}(t) = 2 P_A(t) 10^{G\Delta/10} = \frac{2\pi 10^{G\Delta/10}}{\gamma |2P - L|[10^{G\Delta/10} - 1]} \quad (16)$$

Introducing by definition the asymmetry factor As:

$$As = \frac{1}{L} |2P - L| \quad (17)$$

which can vary between 0 and 1, The optimal output power can then be expressed as:

$$P_{out,optimal} = \frac{2\pi 10^{G\Delta/10}}{\gamma L A_S [10^{G\Delta/10} - 1]} \quad (18)$$

it can be seen from equation (18) that the peak power of the pulses out of the reciprocal loop 26 will be dependent on the gain inside the loop (G$\Delta$), the length of the loop L, and the position P of the gain medium 34 relative to the length L of the fiber inside the reciprocal loop 26.

The basic principle of a laser configuration is that the gain is equal to the losses inside the cavity:

$$G\Delta = \text{cavity losses (dB)} \quad (19)$$

If the reciprocal loop 26 is placed inside a laser resonator, and lasing action is achieved, the gain will be fixed and its value will be independent of the pumping conditions. Therefore an optimal value for the peak power will exist and it will only be dependent on the geometrical configuration of the loop 26 (length and asymmetry factor).

Figure 11:
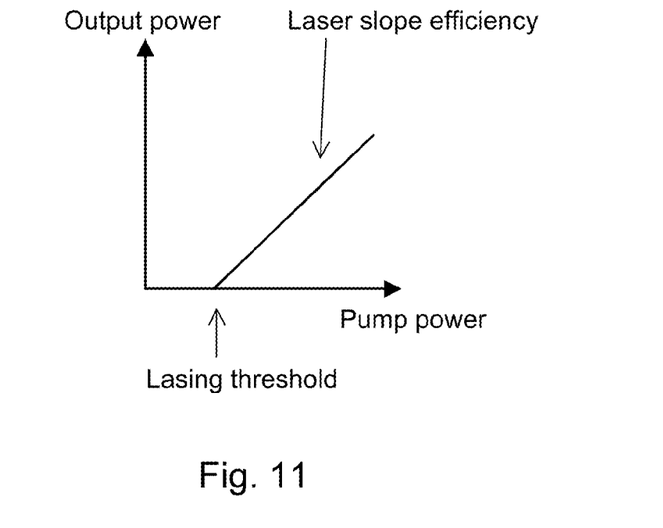
FIG. 11 is a graph showing the relationship between the output power and pump power above the lasing threshold in a laser cavity.

Referring to FIG. 11, the average output power of a laser is defined by its lasing threshold and its slope efficiency:

$$\text{output power} = \text{slope efficiency} \times (\text{pump power} - \text{lasing threshold}) \quad (20)$$

Equation (20) being valid only above the lasing threshold. If the laser is pulsed, its pulse energy is defined as follow:

$$\text{Pulse energy} = \frac{\text{output power}}{\text{repetition rate}} \quad (21)$$

For square optical pulses, the pulse energy can also be expressed as:

$$\text{Pulse energy} = \text{peak power} \times \text{pulse duration} \quad (22)$$

Combining equations (21) and (22), we obtain finally $$\text{pulse duration} = \frac{\text{slope efficiency} \times (\text{pump power} - \text{lasing threshold})}{\text{peak power} \times \text{repetition rate}} \quad (23)$$

If the configuration of the reciprocal loop is such as the laser cannot achieve threshold in continuous-wave (CW) mode because the optimal peak power is too high, it will then need to operate in pulsed mode. In equation (23) the peak power is fixed, the slope efficiency is fixed, the lasing threshold is fixed, and the fundamental repetition rate is fixed since it is related to the length of the laser cavity. The only parameter that can vary with the pump power is therefore the pulse duration. The square pulse is the natural pulse shape associated with this kind of laser since it is a shape with a constant peak power.

The analysis above neglects gain saturation effects inside a same pulse and cross effect between the two pulses propagating in the reciprocal loop. The effects of gain saturation are of second-order. Depending on the application, it may be preferable for the width of the gain medium $\Delta$ to be negligible with respect to the length L of the reciprocal loop in order for the asymmetry factor As to be sufficiently independent of the pump power inside the loop mirror.

As one skilled in the art will readily understand, the analysis above demonstrates that in a laser configuration according to embodiments of the invention, there is a direct relationship between the value of the pump power launched into the gain medium and the pulsewidth of the resulting pulses generated within the cavity. This results into an advantageous mechanism for controlling the pulsewidth of the output pulses through a simple control of the pump power, within a range extending above the operational lasing threshold.

From the reasoning above, the expression "operational lasing threshold" is understood to refer to the state where lasing is achieved through the balancing of cavity losses and gain. As one skilled in the art will readily understand, lasers of the type described above may present hysteresis with respect to pump power, that is, the pump must be increased above a first threshold in order to achieve lasing, but once this is done, the pump can be lowered to a second threshold just above a value for which lasing would stop. In such circumstances, the second lower threshold would be the parameter above which the pump power value is changed in order to obtain the desired pulsewidth adjusting effect.

The pump control means may be embodied by a control of the current feeding the pump source, which can for example be a laser diode. Alternatively, the attenuation between the pump source and the fiber laser may be varied through the use of one or more attenuation component therebetween.

Referring back to FIGS. 1A and 1B, according to an embodiment of the invention the fiber laser 20 further includes an additional gain medium 46 provided in the non-reciprocal loop 24. An additional pump source 48 is coupled to the non-reciprocal loop 24, preferably through a WDM additional pump coupler 50, to launch an additional pump light beam therein. Advantageously, varying the pump power value of the additional pump source 48, through appropriate additional pump control means 52, modulates the amount of losses associated with the non-reciprocal loop 24 of the laser cavity 22. As will be understood from the analysis above, changing cavity losses will fix the gain in the reciprocal loop to a different value (equation (19)), therefore impacting the peak power of the pulses generated. Controlling the pump power value of the additional pump source 48 of the non-reciprocal loop 24 will therefore have no impact on the pulsewidth, but offers a means of controlling the peak power of the light pulses. The additional gain medium and its associated pumping apparatus are optional to the operation of the laser cavity 22, but give added flexibility to control the output power of the fiber laser 20 and extend the available pulsewidth range in the low values as it keeps the laser above the lasing threshold.

Figure 6:
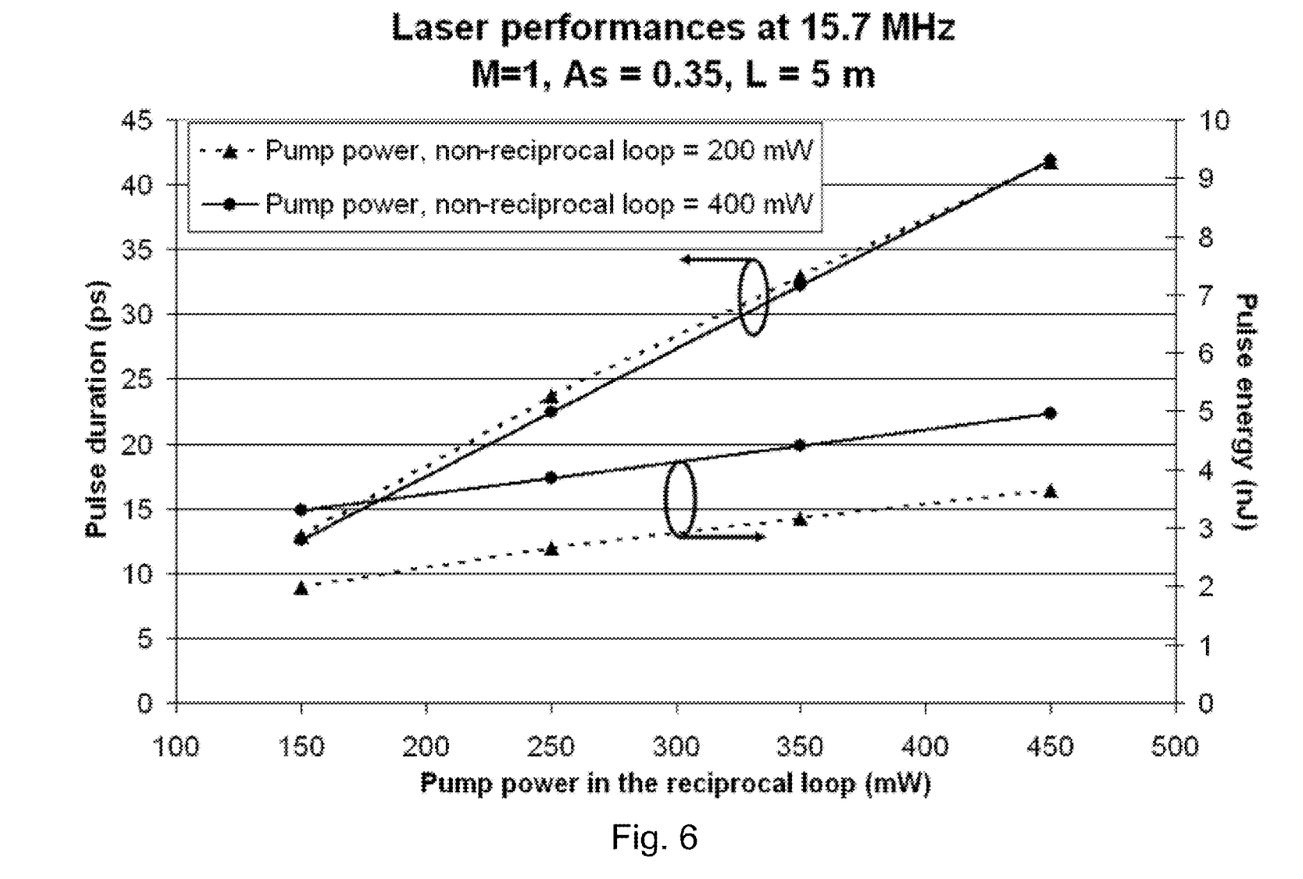
FIG. 6 is a graph showing results of simulated laser performance as a function of pump power in the reciprocal loop for a laser cavity according to an embodiment of the invention.

FIG. 6 illustrates the simulated laser performance as a function of pump power in both gain media, using as an example a cavity having a repetition rate of 16 MHz with a single pulse circulating per round-trip.

An empirical analysis of these simulation results brings the introduction of the parameter $C_{NL}$, which is defined as follow:

$$C_{NL}[W \cdot m] = \frac{As[\ ]L[m]P_{recip}[W]}{M[\ ]} \quad (24)$$

Where As is the asymmetry factor, L is the length of the reciprocal loop, $P_{recip}$ is the pump power in the reciprocal loop and M is the number of pulses per round-trip.

Figure 7:
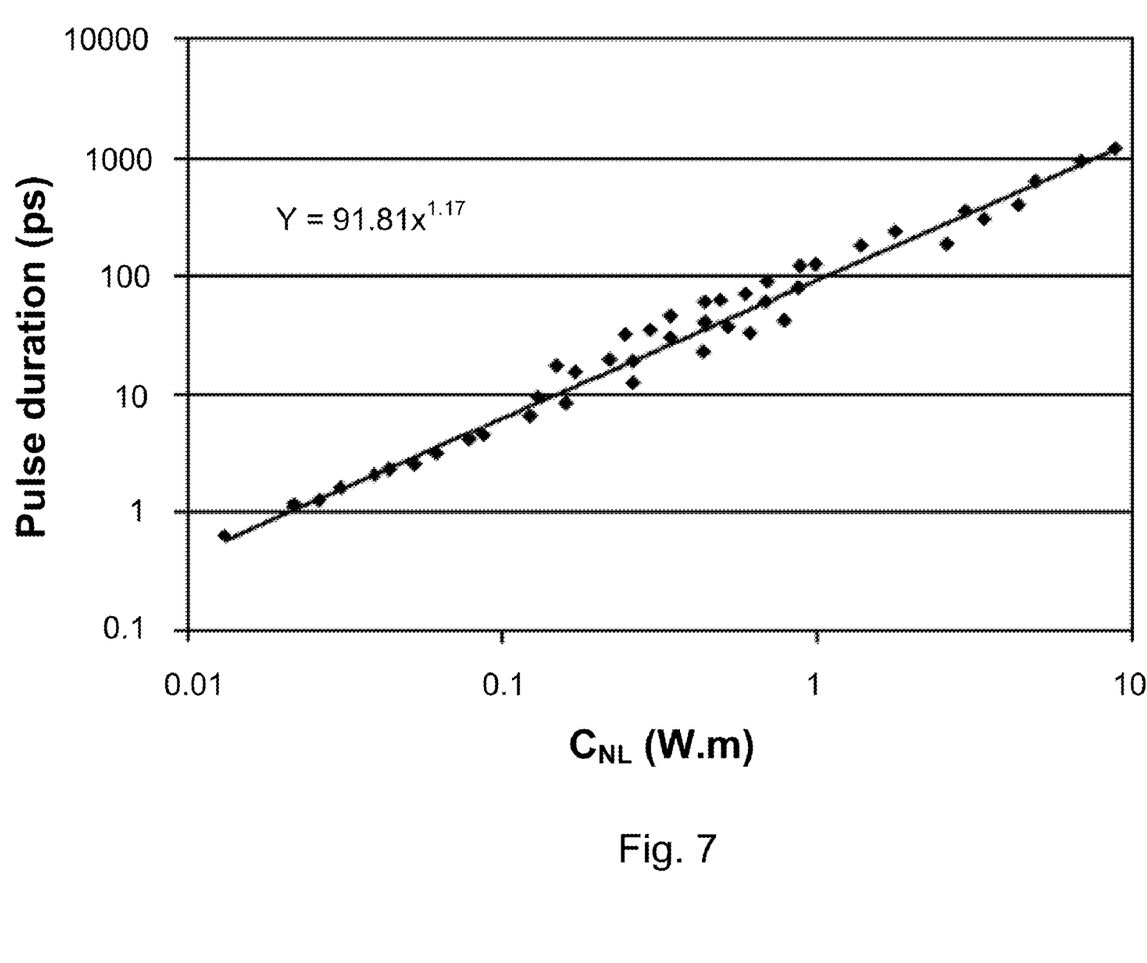
FIG. 7 illustrates the simulated pulse duration as a function of parameter $C_{NL}$.

Referring to FIG. 7, the pulse duration obtained in the simulation mentioned above was plotted as a function of the characteristic parameter $C_{NL}$. This graph may serve as an interesting design tool for the laser cavity according to embodiments of the invention, as the parameter $C_{NL}$ is dependent on characteristics of the reciprocal loop.

Referring back to FIGS. 1A and 1B, preferably, the fiber laser 20 includes a narrowband filter 54 within the laser cavity 22 which selects the spectral band of operation of the laser 20. Typical spectral bands can be selected in the range of 1032, 1050, 1064, 1080, 1530, 1550, 1560 nm, etc. The narrowband filter 54 may for example be embodied by an interferometric filter or a thin-film filter, preferably pigtailed. By "narrowband", it is understood that filter 54 may cover any range of wavelengths appropriate for a target application, for example 5 nm around the central wavelength. It is of interest to note that the narrowband filter 54 does not play a significant role in the propagation dynamic of the light pulses within the laser cavity.

In the illustrated embodiments of the invention, the laser cavity 22 is operated in a passive mode-locked regime. Any appropriate means of mode-locking the laser cavity 22 on the desired operation parameters may be provided. Referring still to FIGS. 1A and 1B, a mode-locking modulator 56 is disposed within the non-reciprocal loop 24 and is actuated at a modulator frequency defining the repetition rate on the light pulses in the laser cavity 22. The modulator frequency corresponds to an integer multiple of a fundamental repetition rate of the laser cavity 22. The mode-locking modulator 56 may for example be embodied by a pigtailed electro-optic phase or amplitude modulator. A repetition rate controller 64 is preferably coupled to the mode-locking modulator 56 for setting the repetition rate.

The mode-locking modulator 56 advantageously facilitates the ignition of the mode-locked regime and its synchronization, but could potentially be switched off if the laser 20 is operated at the fundamental repetition rate, defined by the round-trip time around the laser cavity 22. The fundamental repetition rate may not, however, be suitable for all embodiments and applications. For example, supposing a laser cavity 22 having 20 m of fiber, the fundamental repetition rate of the laser design would be around 10 MHz. If one would select one pulse through a pulse selection mechanism for a particular application, the jitter time could be up to 100 ns between a pulse request and the emission of an optical pulse. This temporal jitter is considered too high for industrial micro-machining applications where high-speed translation stages are used and precise synchronization with the laser source are necessary. To decrease this jitter time down to a more acceptable 2 ns, with a laser operating at the fundamental repetition rate of the cavity, would require a 500 MHz oscillator, which translates to a cavity length 40 cm long. This would be very difficult to achieve using present day optical fiber technology. The operation of the laser on a multiple of the fundamental repetition rate is therefore a requirement for some of the targeted applications.

As one skilled in the art will readily understand, increasing the repetition rate inside the cavity will decrease the pulse energy (the average power being held constant), and since the optimal peak power is fixed by the cavity losses, the pulse duration will have to decrease. Consequently, the tunability range of the pulse duration will depend on the chosen repetition rate.

A feedback loop 58 may also be provided for locking the modulator frequency on the repetition rate of the light pulses. This ensures stable operation in environmentally varying conditions which can affect the fundamental repetition rate. The feedback loop 58 preferably includes a modulator tap 60, for example embodied by a coupler, extracting a fraction of the pulse energy circulating in the non-reciprocal loop 24. A repetition rate analyzer 62 measures the repetition rate of the light pulses and forwards the information to the repetition rate controller 64. In the embodiment of FIG. 1B, a bias controller 68 receives the tap signal from the modulator tap 60 for adjusting the bias point of an electro optic, Mach-Zehnder, amplitude modulator for long-term stability without drift of the amplitude modulator operating point.

A pulse extraction assembly 70 is connected to the non-reciprocal loop 24 for extracting a number, or a pattern of light pulses from the laser cavity 22. The pulse extraction assembly 70 preferably includes an output fiber 72 and an output coupler 74 disposed in the non-reciprocal loop 24 downstream the main coupler 32 along the propagation direction. The output coupler 74 therefore couples optical pulses into the output fiber 72. Preferably, the pulse selection is controlled by an output amplitude modulator 76 disposed in the output fiber 72, which can select one pulse or a pattern of pulses at the request of an external trigger. An external trigger signal 66 may be provided to the repetition rate controller 64 to synchronize the pulse extraction pattern signal sent to the modulator 76 with the circulating optical pulses in the cavity. The output modulator may for example be a phase or amplitude modulator. It may be advantageous to operate the laser at a high repetition rate, as it diminishes the maximum jitter between a trigger request and the produced pattern, this maximum jitter being equal to the period of the laser pulse train. If an electro optic amplitude modulator is used in the pulse extraction assembly, an output modulator tap loop 80 and bias controller 82 may be necessary for long-term drift-free stability of the system. Advantageously, the configuration of the pulse extraction assembly shown in FIGS. 1A and 1B provides a "pulse-picking" capability which can be user controlled. Other configurations could however be considered without departing from the scope of the invention.

As mentioned above, the entire laser cavity 22 is preferably made of PM fiber in order to keep only the interferometric aspect of the nonlinear mirror for the generation of square picosecond pulses. It is known in the art that nonlinear loop mirror made with non-PM components and fibers can demonstrate nonlinear polarization rotation which complicates the short pulse dynamic as it can act as a fast saturable absorber for femtosecond pulse generation. A polarizer 78 is preferably provided in the cavity 22 and fixes a linear state of polarization aligned with either the slow or fast axis of the PM fiber. This device is optional as other components in the cavity could be polarization dependent.

Experimental Demonstration

The design of FIG. 1A was fabricated in one exemplary embodiment of the invention, omitting the mode-locking modulator 56 and associated components. The laser cavity was operated at 1064 nm, using components compatible with this wavelength, and both gain medium 34 and 46 were embodied by Yb-doped fiber. The selection of these parameters was related to the dispersion requirements of the design.

If the laser was operated in the 1550 nm window with Er-doped fibers, the dispersion of the fibers could be mostly anomalous. In that case soliton formation would be possible. The threshold for soliton formation is:

$$N = \sqrt{\frac{\gamma P_0 T_0^2}{|\beta_2|}} \geq 0.5 \quad (25)$$

The energy of a soliton is given by:

$$E = 2P_0 T_0 \quad (26)$$

Consequently the soliton formation threshold in energy is $$E \geq 0.5 \frac{|\beta_2|}{\gamma T_0} \quad (27)$$

For typical values associated with standard telecom fibers, the maximum energy attainable is 800 fJ for 10 ps pulses and 80 fJ for 100 ps pulses. For targeted applications those values are extremely low. Soliton shaping mechanisms are detrimental in the picosecond regime as pulse break-up could occur, and consequently normal dispersion fiber should be employed throughout the laser cavity if high energy pulses are desired.

Referring to FIGS. 2 to 5, preliminary results obtained experimentally with the proposed configuration are shown to illustrate the kind of performance which can be expected.

Figure 2:
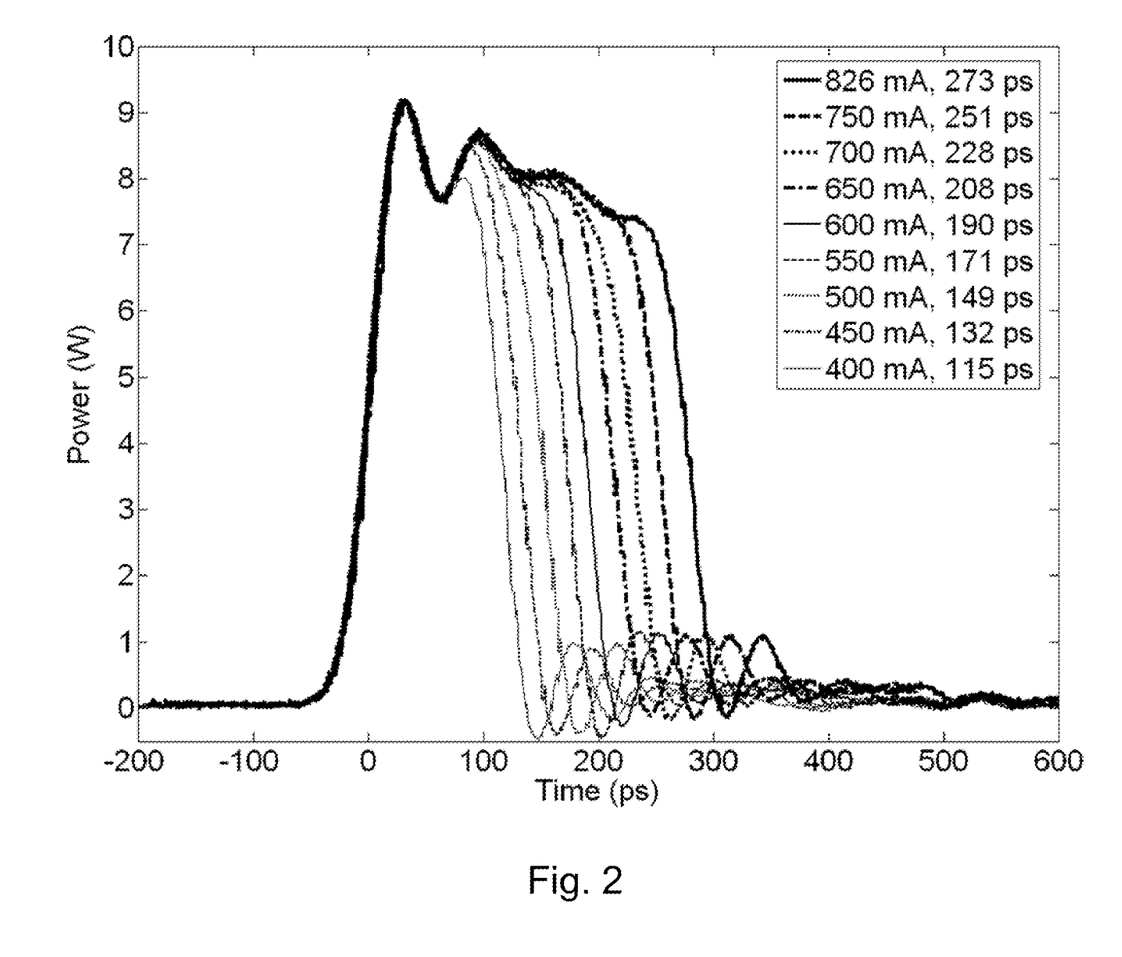
FIG. 2 is a graph showing the temporal shape of experimentally obtained pulses for various pump values, measured using a fast photodiode.
Figure 3:
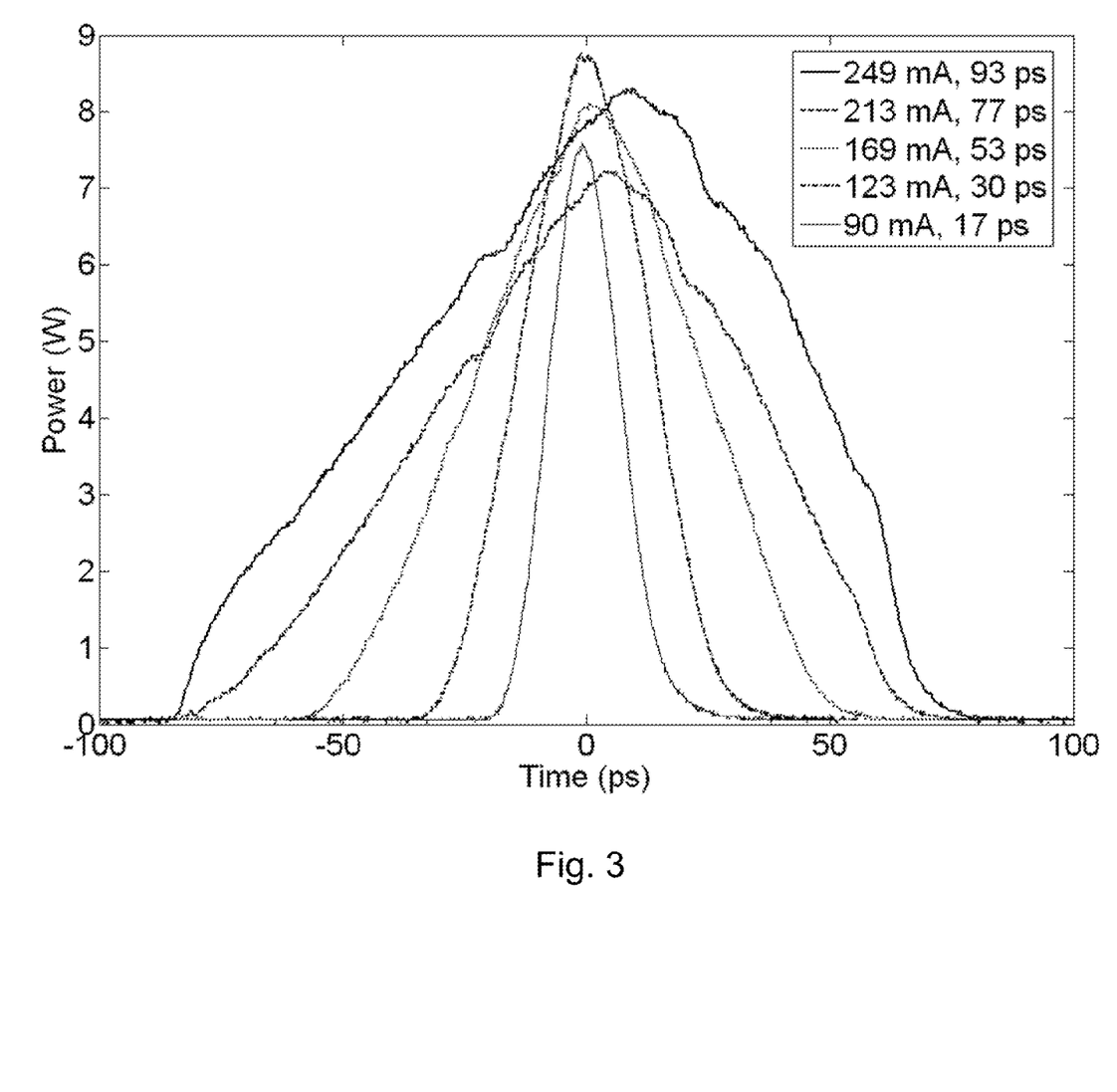
FIG. 3 is a graph showing the deconvoluted autocorrelation traces of experimentally obtained pulses for various pump values, measured using an autocorrelator.

FIG. 2 depicts the measured temporal pulse shape obtained with a fast photodiode (risetime of 35 ps) as a function of the pump power inside the NALM. Measured pulse durations vary from 50 ps to 270 ps. The energy per pulse is around 1 nJ, typical linewidth is 0.3 nm and the fundamental repetition rate is 8 MHz. referring to FIG. 3, other pulses measures using an autocorrelator are shown. Pulse durations as low as 17 ps could be measured in this case. It can clearly be seen from FIG. 3 that the peak power is held constant while the pump power inside the reciprocal loop is changed to vary the pulse duration.

Using the fundamental repetition rate, the highest pulse energy achieved was near 20 nJ and the associated linewidth was around 0.3 nm.

Figure 4:
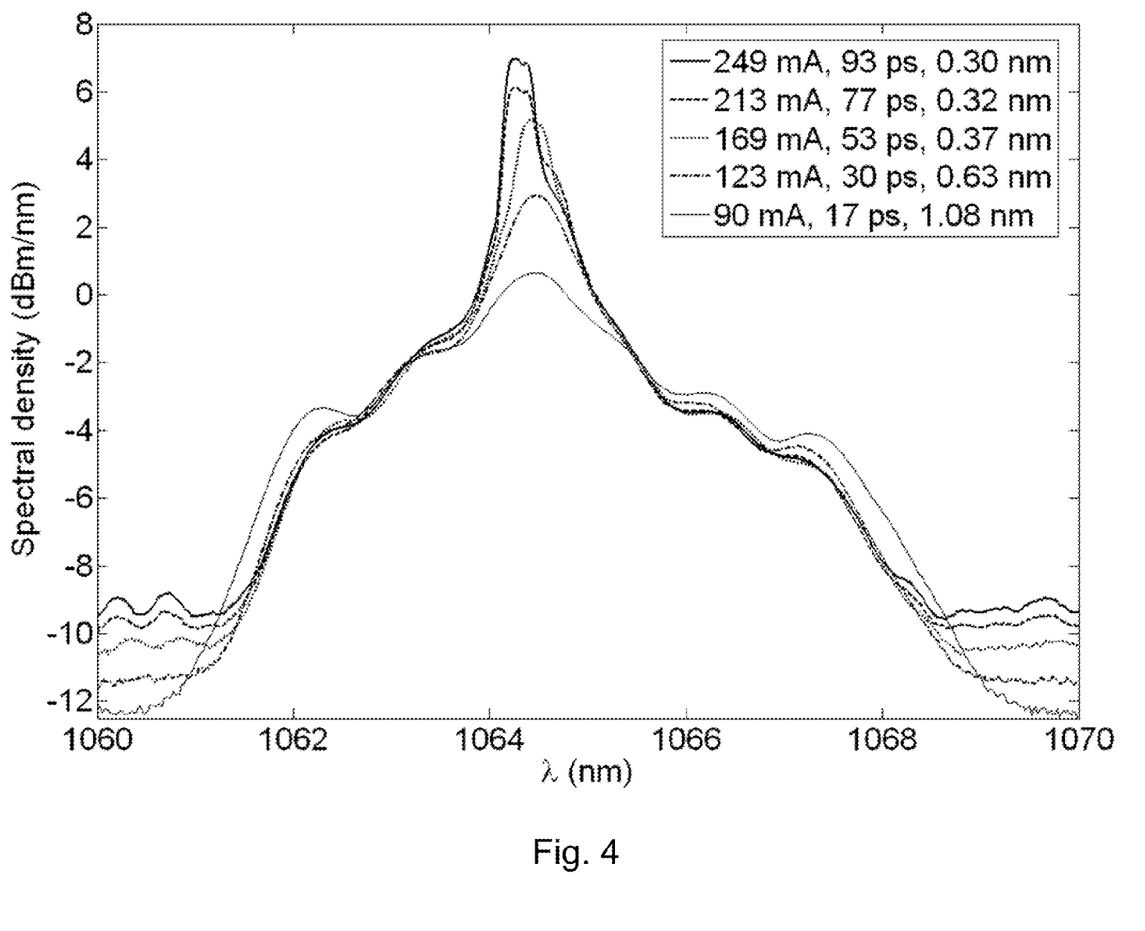
FIG. 4 shows the pulse spectra of the optical pulses of FIG. 3.
Figure 5:
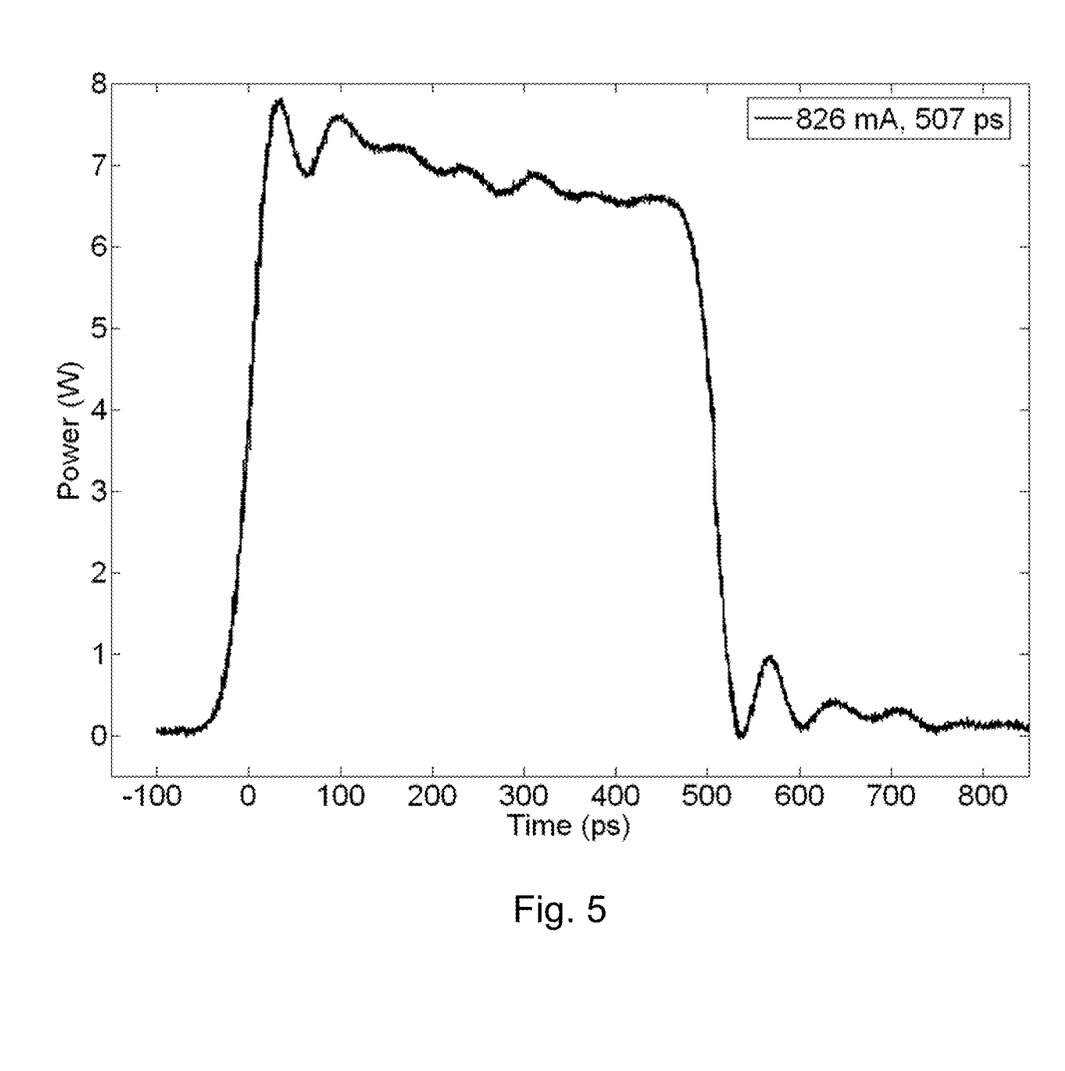
FIG. 5 shows the temporal shape of the longest pulse obtained using an experimental setup similar to the embodiment of FIG. 1A.

Typical pulses spectra are shown on FIG. 4. It is to be noted that the shorter the pulse, the wider the spectrum. The longest pulses which could be generated in this experiment had a duration of 500 ps (see FIG. 5), with a linewidth less than 0.06 nm (limited by the resolution of optical spectrum analyzer).

Of course, numerous modifications could be made to the embodiments described above without departing from the scope of the invention as defined in the appended claims.

The invention claimed is:

1. A fiber laser for generating light pulses having an adjustable pulsewidth, the fiber laser comprising:
a laser cavity comprising optical fiber arranged in a figure-of-eight configuration defining a non-reciprocal loop having a propagation direction therein and a reciprocal loop having opposite propagation directions therein, said laser cavity further comprising a main coupler interconnecting said loops;
a gain medium provided in said reciprocal loop at an asymmetrical position with respect to the main coupler selected so that said light pulses counter-propagating within said reciprocal loop have a phase relationship at the main coupler favoring coupling into the propagation direction of the non-reciprocal loop;
a pump source coupled to the reciprocal loop for launching a pump light beam in the gain medium, the pump light beam having a pump power value;
pump control means for controlling the pump power value of the pump source within a range extending above an operational lasing threshold of the laser cavity, wherein changing the pump power value of the pump source within said range changes the pulsewidth of the light pulses without modifying a peak power of said light pulses.

2. The fiber laser according to claim 1, wherein the optical fiber of the laser cavity is polarization-maintaining fiber.

3. The fiber laser according to claim 1, wherein the optical fiber of the laser cavity is normal dispersion fiber.

4. The fiber laser according to claim 1, wherein the optical fiber of the laser cavity is polarization-maintaining normal dispersion fiber.

5. The fiber laser according to claim 1, wherein the reciprocal loop has a length and the gain medium has a length which is significantly shorter than the length of the reciprocal loop.

6. The fiber laser according to claim 1, wherein the reciprocal loop comprises opposite extremities connected to the main coupler, said main coupler coupling light into said opposite extremities according to a ratio of substantially 50/50.

7. The fiber laser according to claim 1, further comprising an isolator provided in the non-reciprocal loop and positioned therein to prevent light propagation in a direction opposite the propagation direction.

8. The fiber laser according to claim 1, further comprising:
an additional gain medium provided in the non-reciprocal loop; and
an additional pump source coupled to the non-reciprocal loop for launching an additional pump light beam in the additional gain medium.

9. The fiber laser according to claim 8, further comprising additional pump control means for controlling a pump power value of the additional pump source, wherein changing the pump power value of the additional pump source changes the peak power of the light pulses.

10. The fiber laser according to claim 1, further comprising a narrowband filter provided within said laser cavity and selecting a spectral band of operation of said laser.

11. The fiber laser according to claim 1, further comprising a polarizer disposed within said laser cavity imposing a linear state of polarization to the light pulses propagating therein.

12. The fiber laser according to claim 1, further comprising a pulse extraction assembly connected to the non-reciprocal loop for extracting a number of said light pulses from the laser cavity.

13. The fiber laser according to claim 12, wherein the pulse extraction assembly comprises:
an output fiber; and
an output coupler disposed in said non-reciprocal loop downstream the coupler of the laser cavity along said propagation direction, said output coupler coupling said number of said light pulses into the output fiber.

14. The fiber laser according to claim 13, wherein the pulse extraction assembly comprises an output modulator disposed in the output fiber for selecting a pattern of output light pulses from said light pulses.

15. The fiber laser according to claim 1, further comprising mode-locking means for initiating a mode-locked state within said cavity.

16. The fiber laser according to claim 15, wherein the mode-locking means comprise a mode-locking modulator disposed within said non-reciprocal loop and actuated at a modulator frequency defining a repetition rate on the light pulses in said laser cavity corresponding to an integer multiple of a fundamental repetition rate of said laser cavity.

17. The fiber laser according to claim 15, wherein the mode-locking modulator is a phase modulator.

18. The fiber laser according to claim 16, wherein the mode-locking modulator is an amplitude modulator.

19. The fiber laser according to claim 16, wherein said mode-locking means comprise a feedback loop for locking the modulator frequency on the repetition rate of the light pulses.

* * * * *